United States Patent [19]
Smith et al.

[11] Patent Number: 5,283,882
[45] Date of Patent: Feb. 1, 1994

[54] DATA CACHING AND ADDRESS TRANSLATION SYSTEM WITH RAPID TURNOVER CYCLE

[75] Inventors: Christopher E. Smith, Orange; Robert L. Noble, Riverside; Howard J. Keller, San Diego, all of Calif.

[73] Assignee: Unisys Corporation, Blue Bell, Pa.

[21] Appl. No.: 660,455

[22] Filed: Feb. 22, 1991

[51] Int. Cl.5 .............................................. G06F 12/06
[52] U.S. Cl. ................................. 395/425; 395/400; 364/DIG. 1
[58] Field of Search ... 364/200 MS File, 900 MS File; 395/400 MS File, 425 MS File

[56] References Cited

U.S. PATENT DOCUMENTS

| | | | |
|---|---|---|---|
| 4,669,043 | 5/1987 | Kaplinsky | 395/400 |
| 4,763,250 | 8/1988 | Keshlear et al. | 395/400 |
| 4,797,817 | 1/1989 | Nguyen et al. | 395/400 |
| 4,980,816 | 12/1990 | Fukuzawa et al. | 395/400 |
| 5,053,951 | 10/1991 | Nusinov et al. | 395/375 |
| 5,133,058 | 7/1992 | Jensen | 395/400 |

*Primary Examiner*—Joseph L. Dixon
*Assistant Examiner*—Reba I. Elmore
*Attorney, Agent, or Firm*—Alfred W. Kozak; Mark T. Starr

[57] ABSTRACT

An address couple associateive memory (ACAM) for a processor in a chip package provides a first address couple (ACL) CAM and a second absolute address list (AAL) CAM. An associated control unit guarantees coherency of word data in a cache RAM and main memory by indicating the invalidity or validity of each location of address data in the first CAM (ACL) and second CAM (AAL). Each loaction of data words in the cache RAM is associated with a corresponding location in the first (ACL) CAM and in the second (AAL) CAM. Address translation is provided in one clock cycle when writing to a location in main memory specified by a logical address couple.

12 Claims, 11 Drawing Sheets

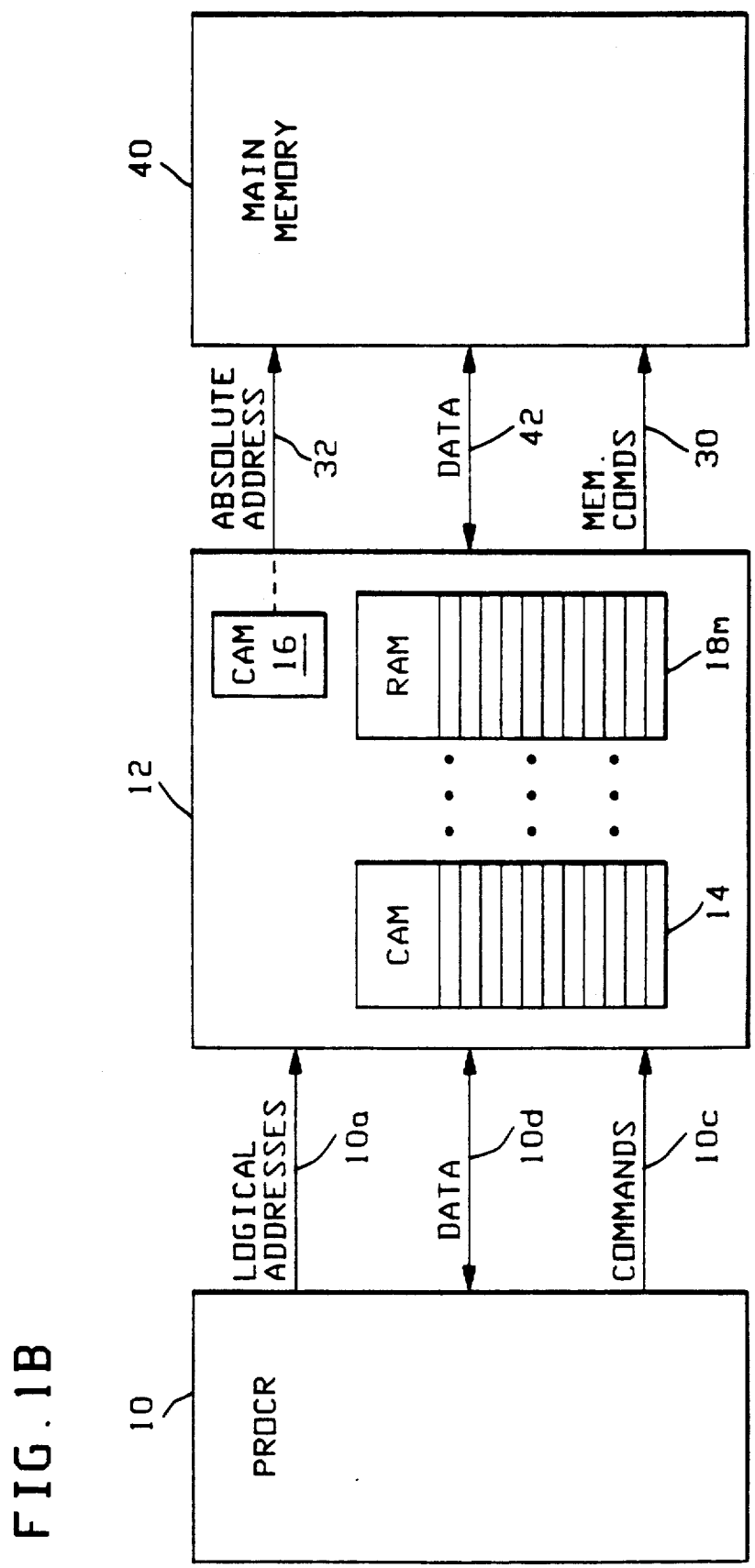

MAU=MEMORY ACCESS UNIT
CU=CODE UNIT
EX=EXECUTION UNIT
CCR=CACHE CONTROL & STORAGE UNIT
RU=REFERENCE UNIT

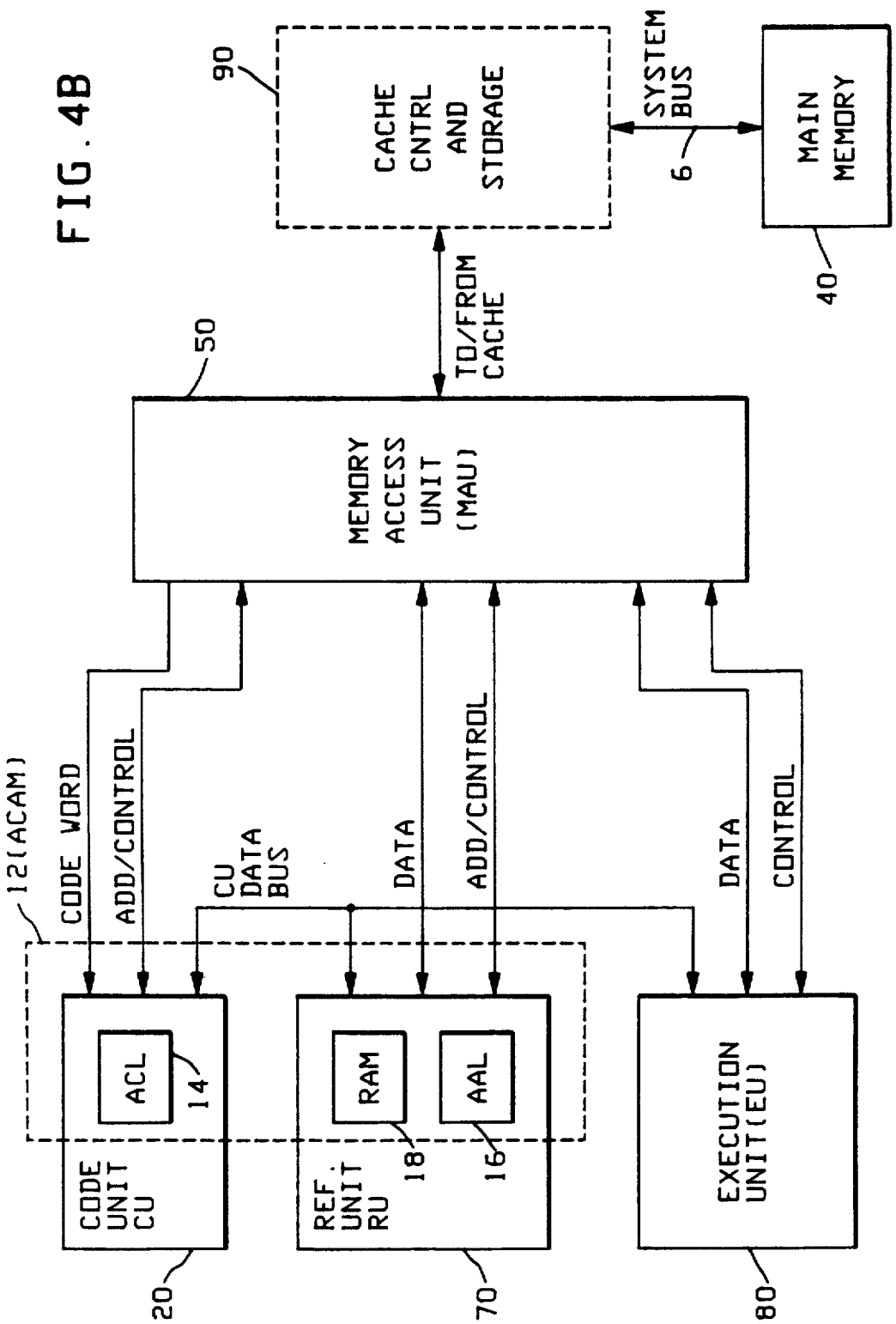

DATA CACHING AND ADDRESS TRANSLATION SYSTEM WITH RAPID TURNOVER CYCLE

FIELD OF THE INVENTION

This disclosure relates to a highly efficient system of providing the most frequently used data to a processor without delay. The system uses a CAM/RAM combination with a secondary CAM used to provide fast address translation and to ensure coherency of stored data with main memory.

CROSS REFERENCES TO RELATED APPLICATIONS

This disclosure is related to a commonly owned co-pending application entitled "Dual Ported Contend Addressable Memory Cell and Array" which issued as U.S. Pat. No. 5,226,005. This patent indicates how a Search-Match operation or a Read-Data Out operation can be accomplished in one clock cycle by a dual ported CAM. This patent is included herein by reference.

BACKGROUND OF THE INVENTION

In order to speed up the retrieval time for data in computer systems, a cache memory is often used to provide ready access of the data to the computer, without the need to address and access a much slower main memory.

A CAM (content addressable memory) is a memory structure whose function is to indicate which of the internal data locations contains a data word presented to it as a 'search key'. A data word is initially written in to the CAM at a location indicated by an address input and thereafter if the exact same address input appears on the 'search key' input, an indication of a match, called a match flag, is asserted and the 'Location Number' of the data location containing the search key data is also providd as an output.

The location number output of a CAM is often used as an address input to a RAM. The RAM then provides as an output the data residing at the location corresponding to the locaton number of the original match in the CAM.

A CAM/RAM combination may conveniently be used to implement a cache: The search key provided is the address (logical or physical) where a required data word resides in main memory. If the address is present in the CAM, then a match is found and the RAM, reading fromthe location provided by the CAM location number, supplies the data which resides at that address in main memory. This circumvents the lengthy address translation and memory access procedures. If on the other hand the address is not found in the cache, then the normal read from main memory procedures is followed. When the data returns, it is stored along with its address in the CAM and RAM. Any time this address is subsequently read, a match will be found and the data will be provided.

The overriding problem with using a cache is that the data in main memory may be changed from time to time. If a memory location whose address is stored in the CAM has its contents changed, then the data stored in the RAM is no longer correct. At this time either the correct data may be written into the RAM or the address must be removed from the CAM. The process of updating the cache to reflect the main memory contents is referred to as maintaining coherency of the cache.

The CHAMP processor, discussed herein in connection with FIGS. 4A and 4B, is a stack based architecture. The most frequently used data words are items from an 'expression stack' which is used continuously as processing is done. Items in the stack are identified by a logical addressing scheme known as 'address couples' which give the position of the word in the stack relative to the base of the stack. These address couples occur frequently in the code stream with a relatively small number of them being used very repetitively at any given time. These address couples can be translated into "absolute" addresses by the processor but the process is tedious and involves execution of many processor steps and often may require several memory accesses. The performance of a processor can be increased many times over by using a cache which provides the required data without delay.

The ACAM cache (Address Couple Associative Memory) described hereinafter is such a caching scheme. It allows execution of instructions in the processor without any delay in waiting for data when a cache hit occurs. The achievable hit rate is high and coherency is continuously maintained.

A cache system such as shown in FIG. 1B, provides for an association between a content addressable memory (CAM) 14 and a RAM $18_m$ which has a word of data associated with each location of the content addressable memory. The content addressable memory carries address couples in a list and each address is connected to a location in the associated RAM memory which holds the data corresponding to that address, while the associated RAM location holds the data residing at the corresponding physical address in main memory. Thus both address translation and data access is provided.

When the processing unit sends an address couple to the content addressable memory 14, if there is a match or a "hit", then the data which correspondingly resides in the associated location of the RAM memory $18_m$ will be immediately provided to the processing unit (10).

SUMMARY OF THE INVENTION

An address couple associative memory (ACAM) module provides a RAM cache which contains duplicate data of data in main memory when such data is frequently accessed for use by the local processor. The ACAM has an Address Couple (ACL) CAM (content addressable memory) which holds "logical addresses" associated with each unit of data in the RAM cache.

The ACAM module provides a second CAM called the absolute address list CAM (AAL unit) which stores the absolute (physical) address (referring to main memory) of each data word in the RAM cache. Each of these absolute addresses will reside in a location equivalent to the location of the corresponding "logical address" in the ACL CAM. Each location in the ACL unit and the AAL unit also has a tag bit to indicate "valid or invalid data".

Whenever a new main memory Write is done through use of the "Address Couple logical address", the list of Address Couples in the ACL CAM unit is checked to see if that same address is present therein. If it is, then the corresponding ACAM RAM cache location can be (i) updated or else (ii) invalidated, thus maintaining the "coherency" of the RAM cache.

However, it is also possible that a location in main memory (whose duplicate data is stored in the ACAM RAM) may be written over without the use of Address Couple. In this case, the coherency of correspondingly addressed data, in the main memory and in the RAM cache, is jeopardized.

This problem situation is solved by use of the second CAM or Absolute Address List (AAL) CAM. The absolute physical address (of each data word stored in the RAM) is stored in the location of the AAL CAM which corresponds to the location of the address couple data in the ACL CAM.

Thus whenever a main memory "Write" is carried out "without" using an Address couple, the Absolute Address (of the main memory target location) is compared with the "valid" entries in the AAL CAM. If a "hit" is found, then the Write to main memory is allowed to proceed, but the location of the hit is invalidated in the AAL CAM and the ACL CAM. Thus coherency is maintained.

Whenever an "address couple" logical address is encountered in the code stream and the address couple is not present in the ACL CAM unit (that is, the search does not yield a "hit"), then the address couple is stored in an allotted location in the ACL CAM unit. The location number (LN) of this is passed on to the AAL CAM (which stores the translated absolute address) and to the RAM cache which stores the data read or written to that location.

The operation of the processor is such that translation from a logical address to a physical address must be accomplished before any read or write to memory may be initiated. This typically occupies the processor for several machine cycles and results in a degraded performance. However, the ACAM cache, by relating the logical address to the data at the corresponding physical address at main memory, obviates the need for the translation and the memory read operation. This operation, which is very common in the operation of the machine and hence critical to performance, is reduced from a dozen or more clocks to a single clock. This also reduces the amount of memory traffic and indirectly helps throughput in other areas of the processor.

The ACAM address translation is also useful in memory write operations. The write address is very often specified with an address couple logical address. If this address couple is present in the ACAM Address Couple list, then the corresponding absolute physical address is by definition present in the absolute address list.

Thus by being able to read the AAL by using the Location Number (LN) from the ACL as the Read address, the address translation and main memory Write can be achieved in a single cycle thus speeding and enhancing processor performance.

BRIEF DESCRIPTION OF THE DRAWINGS

FIG. 1B is a basic diagram showing a typical relationship of a processor, a cache (ACAM) unit and main memory;

FIG. 4B is block diagram showing aspects and architecture of FIG. 4A.

DESCRIPTION OF PREFERRED EMBODIMENT

Figure 1A:
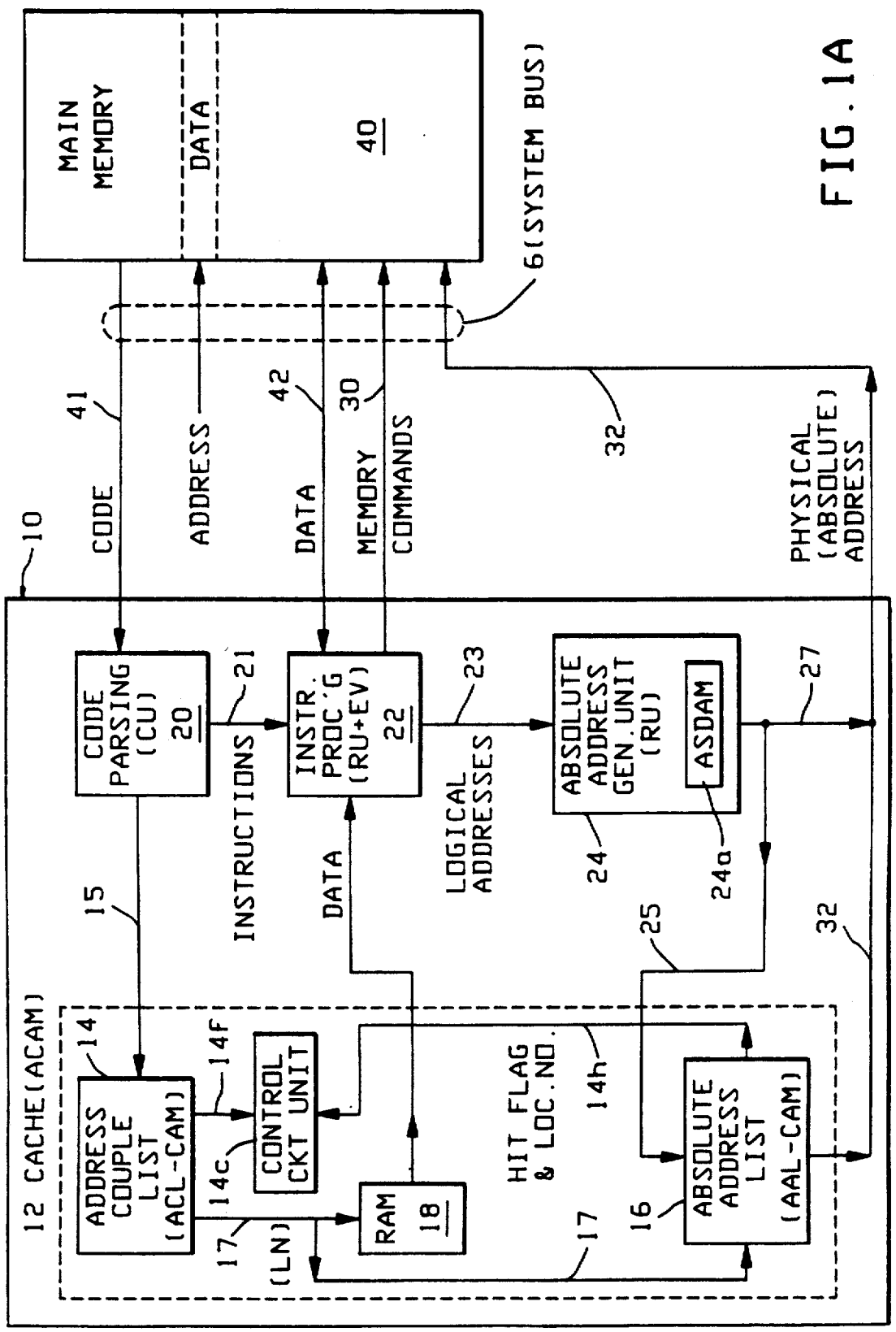
FIG. 1A is a detailed block diagram showing the relationship of certain aspects of the processing unit with the presently disclosed CAM cache system and the main memory.

Referring to FIG. 1A, the basic architecture will be seen to involve a processor or processing unit 10 which includes cache system 12, called an Address Couple Associative Memory (ACAM).

The Cache System 12 is seen composed a random access memory 18 and content addressable memory sub-units called the Address Couple List (ACL) 14 and also the absolute address list 16 (designated AAL).

In the basic architecture shown in FIG. 1B, the processor 10 provides "logical" addresses on bus $10_a$; it provides data on bus $10_d$ and provides commands on bus $10_c$. Each of these are fed to the cache system 12.

As between the cache system 12 and the main memory 40 there is a bus 42 for the transmission of data; there is a bus 30 for transmission of memory commands. Additionally there is a bus 32 for transmission of absolute addresses.

The cache system 12 of FIG. 1B may also be designated as an ACAM or an address coupled associative memory.

Referring to FIG. 1A, there is seen a detailed block diagram of the system wherein the processor 10 has a number of operating units which include the code parsing (CU) unit 20, the Instruction Processing Unit 22, (RU, EU) the Absolute Address generation unit 24 (RU), which work in conjunction with the ACAM (address coupled associative memory) 12. The processing unit 10 is connected to the main memory 40 by means of the data bus 42, memory command bus 30, absolute address bus 32, and the code transfer bus 41. The combination of the buses 41, 42, and 30 may be designated as an overall bus which is called the system bus 6.

As seen in FIG. 1A, the address coupled associative memory ACAM 12 is provided with a content addressable memory which is the address couple list ACL 14 and another content addressable memory called the absolute address list (AAL) 16.

It will be seen that Code Parsing Unit 20 selects and provides address couples on bus 15 to the address couple list 14 (ACL). Likewise the Absolute Address Generation unit 24 provides absolute addresses on bus 25 to the absolute address list, AAL 16.

The address couples list, ACL 14 provides "location numbers" (LN) to the data RAM 18, in addition to providing location numbers to the absolute address list, AAL 16.

The absolute address list, AAL 16 provides an absolute address on bus 32 over to the main memory 40. The main memory 40 has a series of data words located at various addresses within the main memory.

The absolute address list, AAL 16, is a content addressable memory (CAM) which may be used for supplying absolute addresses when "writing" to the Main Memory 40 and it also operates to "guarantee coherency" of data in the system as will be discussed hereinafter. This ACL and AAL-CAM 16 together translate logical addresses into "absolute addresses" in a "single clock cycle".

This single-clock cycle operation, in which a search-match and read-data-out is performed in one clock cycle is the subject of the heretofore mentioned co-pending application entitled "Dual Port CAM Cell and Array" now U.S. Pat. No. 5,226,005. Thus the writing into Main Memory 40 can be accomplished many times faster than previous processor-to-memory cycles.

The address couple list, ACL 14 is a content addressable memory which holds "logical addresses". It provides an output which is called the "location number", LN, which is the address of the CAM location containing the address couple logical address provided. It may be noted that the "absolute addresses" in (FIG. 3) the content addressable memory 16 (AAL) are actually the same as the physical addresses which correlate to the actual physical address locations in main memory 40. These correlate locationally to "logical" address data in the address couple list of CAM 14 (ACL).

In FIG. 1A, the code directed to the processor 10 is transferred from the main memory along bus 41. Then the Code Parsing Unit (CU) 20 is used to receive the code stream and to select certain information from it such as "address couple" information.

Figure 5:
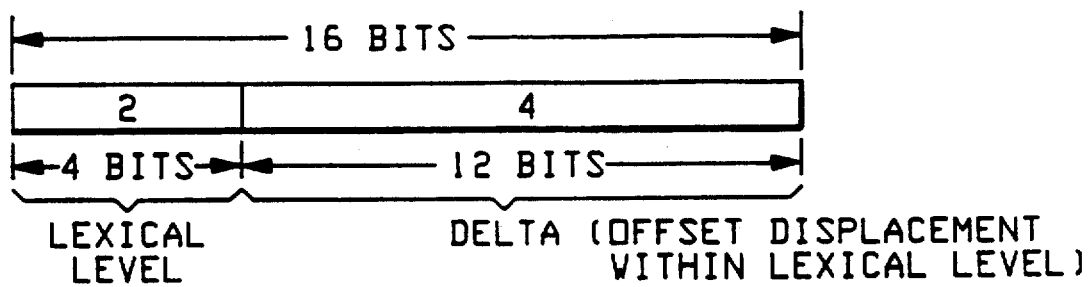
FIG. 5 is a schematic drawing of an address couple residing in the Address Couple List CAM.

The address couple is used only in stack-based architectural systems. As seen in FIG. 5 the address couple involves a segment of data of 16 bits. The first 4 bits are called the "lexical" level while the last 12 bits are called the "delta" level or "displacement" level (FIGS. 5 and 6).

Figure 6:
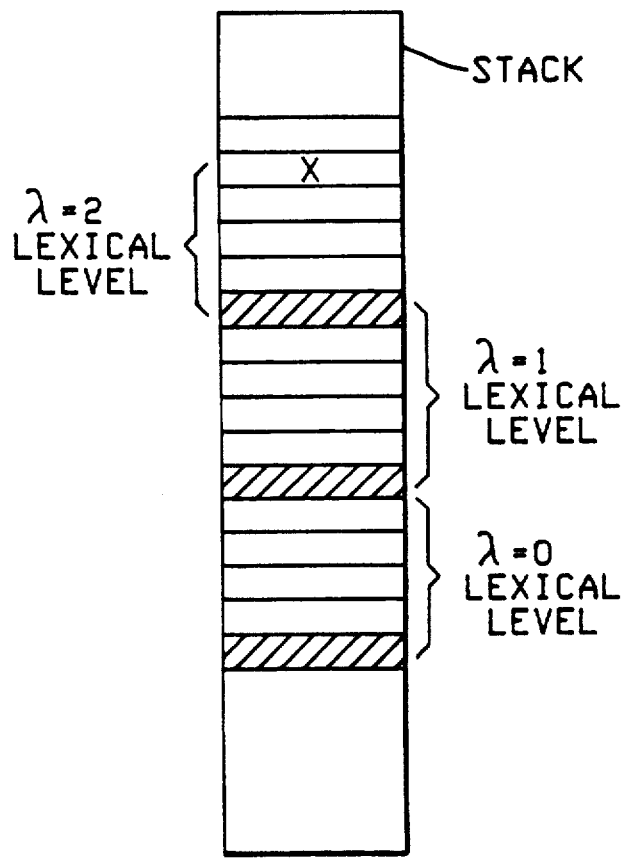
FIG. 6 is a schematic drawing of the stack indicating the level of storage indicated by the lexical level of the address couple.

As seen in FIG. 6, the data is placed in a stack and each routine has its own "group level location" in the stack so that there would be, for example, group 0, group 1, and group 2, etc. which are the various "lexical" levels. This involves the nesting of sub-routines.

The first 4 bits which is the "lexical level" (FIG. 5) will have a certain value such as "2" which means it belongs to group 2 in the stack. Then, to locate the actual data involved in the group 2, there is used the displacement (delta unit FIG. 5) of 12 bits which, for example might be a binary "4" which means it is the 4th line of data in the "second" group. This indicates the "offset" within the lexical level (FIG. 5). Thus, what occurs is the following data notation —(2,4)—, which is an example of an address couple in the address couple list (ACL) 14 of FIG. 1 and FIG. 2.

The instruction processing unit 22 of FIG. 1A is the unit which receives instructions which have been parsed by the Code Parsing Unit (CU) 20. One output of the instruction processing unit 22 is then a set of "logical addresses" which are sent to the Absolute Address Generation unit 24.

It may be noted that such systems as the presently described one, require what is called "address translation which means that the logical addresses on bus 23 (from the Instruction Processing Unit 22) must be converted into absolute or physical addresses before they can be applied to main memory, 40. The absolute address generation unit 24 provides such address translation.

The address couple list, ACL 14 is the content addressable memory (CAM) which holds a list of the logical representation of single addresses as previously described.

Figure 2:
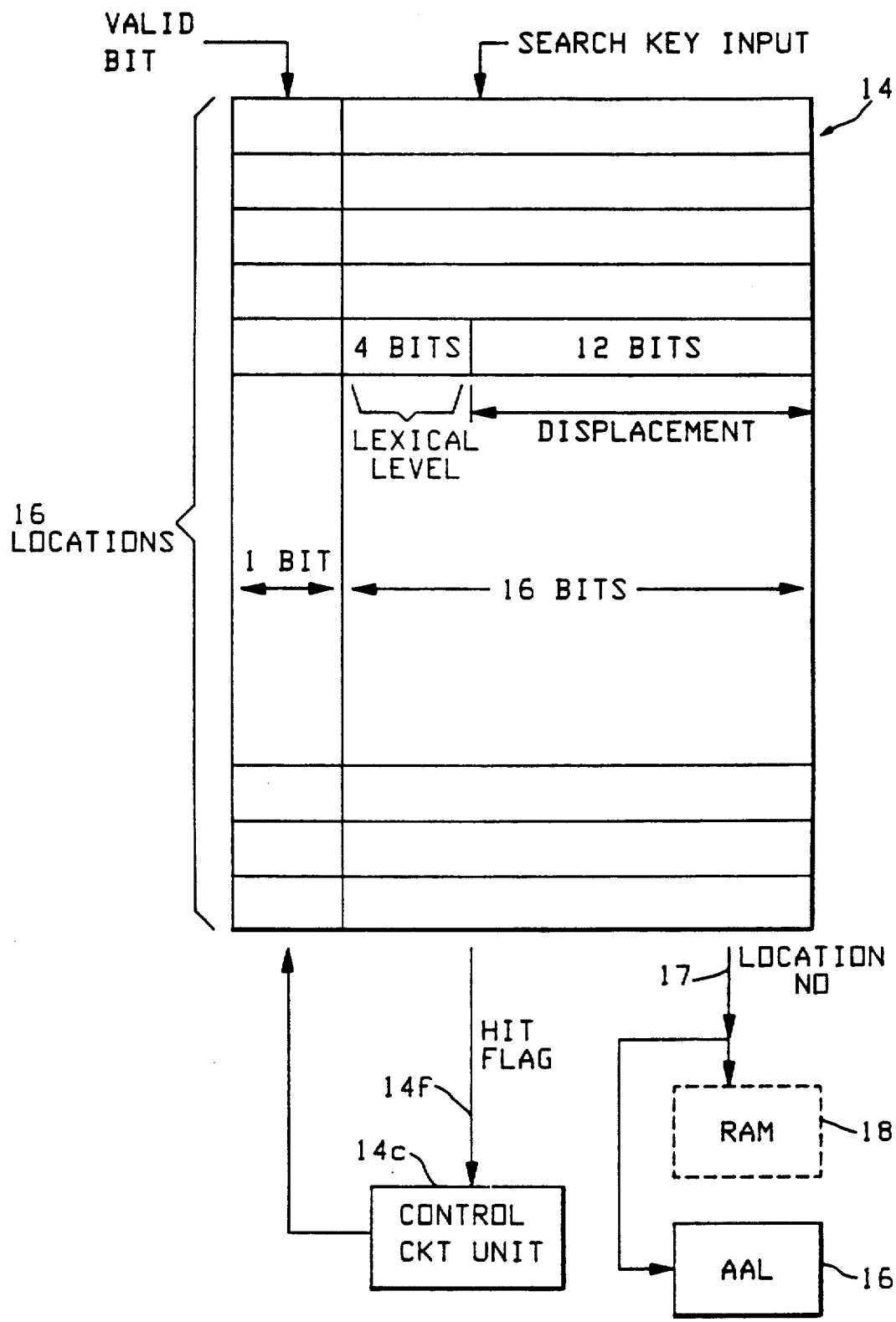
FIG. 2 is a schematic drawing of the address couple list (ACL) content addressable memory (CAM)

In reference to FIG. 2 there is seen a schematic drawing of the address couple list ACL 14. The address couple list ACL 14 provides a set of 16 locations into which there is input what is called the "search key". In each of the 16 locations there is an area of 16 bits of which 4 bits are for the "lambda" or lexical level of the nesting of sub-routines while the remaining 12 bits involve the "delta" information which is the displacement within the lexical level as was described in connection with FIGS. 5 and 6.

Additionally, as seen in FIG. 2, each of the 16 locations of the address couple list, ACL 14 also have a bit position to indicate whether the information involved is "valid" or is "invalid". A location is validated by the control circuit unit $14_c$ block, in FIG. 1A, when an address couple is written into the corresponding ACL location. A location may be invalidated, to maintain coherency, when a write is issued to main memory with a absolute address which is present in the AAL, i.e. an address corresponding to an address couple in the ACL.

One output $14_f$ from the address couple list, ACL 14 is the "hit flag" which goes to a control circuit $14_c$, in FIG. 1A.

Figure 4A:
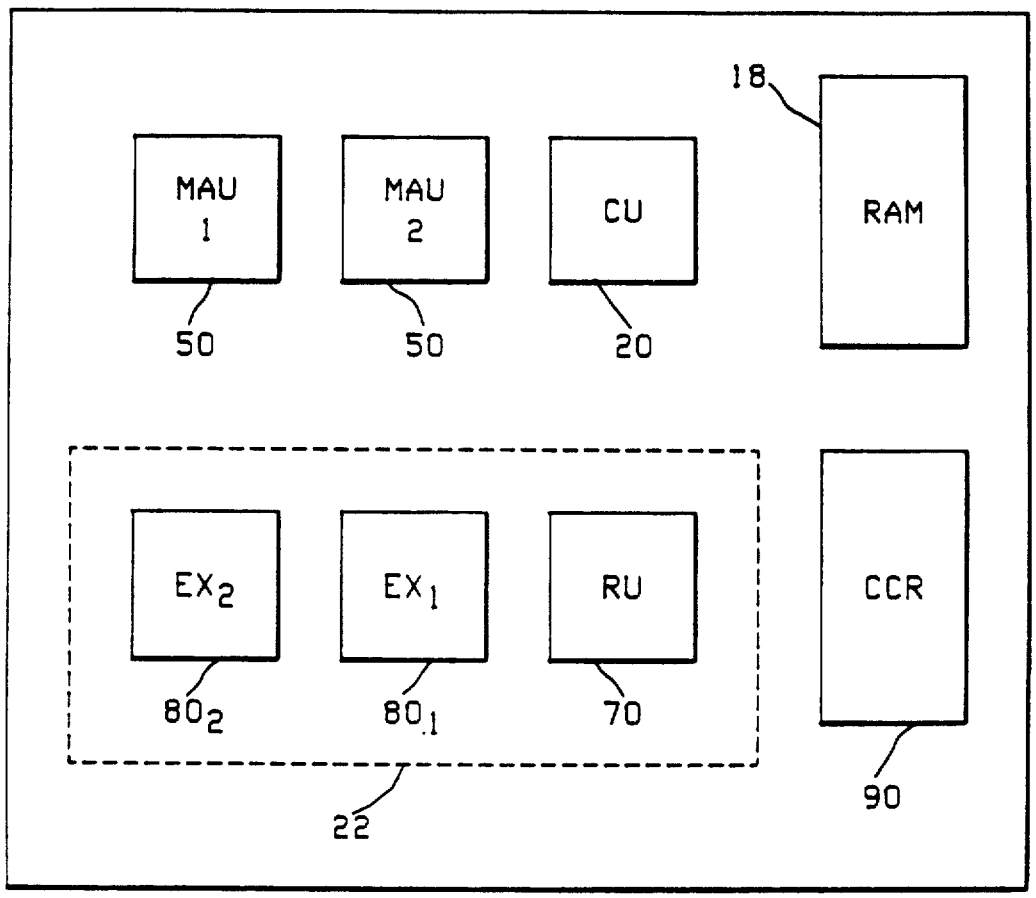
FIG. 4A is a schematic drawing of a chip package showing processing unit RAM and its related components.

The control circuit $14_c$, FIG. 1A, may be considered a fourth block within the ACAM cache (12). It physically resides in the reference Unit RU70, in the system of FIG. 4A which is called the CHAMP processor. Since it controls all three other units, it is connected to each of them. It receives the hit line from the two CAMs 14, 16) and supplies both CAMs and RAM 18 with write addresses and write enable signals as well as instructions to validate or invalidate locations. It also receives the location number of the AAL hit.

Another output from the address couple list, ACL 14 is the location number LN of the hit which is sent off to the RAM 18, which indicates the data corresponding to the address of the "hit".

The ACL 14 has a hit flag: it is sent to control circuit block in $14_c$ which subsequently invalidates the location of the hit. Line 32 of FIG. 1A carries the contents of the AAL 16 at the location number LN supplied by the ACL 14. This is a 32 bit absolute address which is supplied as a Write address to main memory.

In reference to FIG. 2, it will be seen that the "valid bit" locations are set and reset by Control Logic in $14_c$. Also, an output from the address couples list ACL 14 is fed out as a hit flag which is transmitted to the control unit $14_c$. Additionally, another output line 17 from the address couples list, ACL 14, is a location number LN which is transmitted to the RAM 18 and AAL 16 in order to locate the data corresponding to the absolute address.

Figure 3:
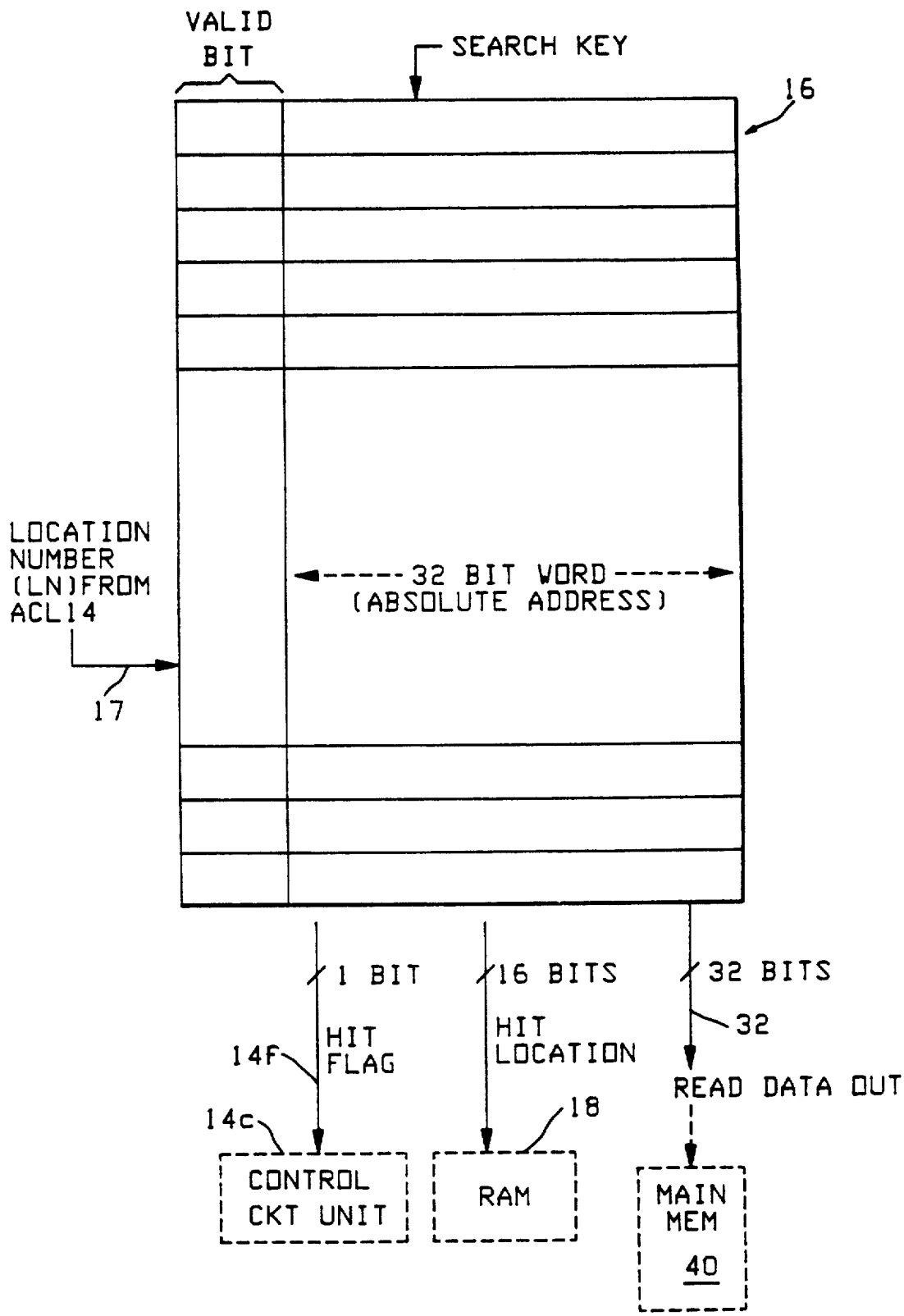
FIG. 3 is a schematic drawing of the absolute address list (AAL) content addressable memory (CAM)

Referring to FIG. 3, there is seen a schematic drawing of the absolute address list 16. This is a content addressable memory which provides a dual port structure which permits the functions of "matching" and also read out of address data 32 in the same clock cycle.

The absolute address list AAL 16 holds a series of 32-bit words, which is to say that there are 16 locations wherein each location holds a 32-bit word. Additionally, each word has a bit portion called "valid bit portion" to indicate whether the data at that location is valid or not.

The input to the absolute address list AAL 16 is a "search key".

The input to any CAM on which a search is to be performed is referred to as "Search key". The source of the Search key for the AAL 16 is the 32 bit absolute address generated by the Absolute Address Generator 24, of FIG. 1A.

Another input to the AAL 16 is the location number LN which is received from the address couples list ACL 14.

An output of the absolute address list, AAL 16, is seen to be a "hit flag" on line $14_h$ and location number which goes to the control unit $14_c$.

Additionally, there is an output line 32 which is the "read data line" which provides the absolute address ("physical address") to the main memory 40.

The location number LN and the word "match" are used exclusively for clarity. LN is used to refer to the location of data in a CAM at which a match is found. The LN from the ACL CAM is an input to the RAM 18 and is used as an address from which to read data from the RAM.

FUNCTIONAL OPERATION: There are two modes of operation involving the CAMs 14(ACL) and 16(AAL):

(A) A search for a valid location in ACL 14 containing the 16-bit word is involved on the "Search key" input. The output hit flag 14f, FIG. 2 indicates that the desired data address was found therein and the location number (LN) indicates where it was found, and conveys this LN to the AAL 16, and RAM 18. Then, the data in RAM 18 is read out.

(B) There is also a WRITE operation where the system writes a 16-bit word on the Search key input FIG. 2. This is put into a location which is allocated internally and given a LN location number output. After this, the system sets the "valid bit" for this location. This Write operation is accomplished after a previous unsuccessful Search operation.

The bus 41 of FIG. 1A indicates the "code stream" which is a result of the software wherein the high level software language is turned into machine code by means of a compiler. The code stream is a set of zeros and ones which are in machine code. These show up in 8-bit groups and each of these 8-bit groups will provide certain information such as for example an "Add" operator or a "Subtract" operator or an "Address Couple" or other commands and information.

Regarding FIG. 1A, it may be indicated that the system uses different cache systems. These include the following:

(a) The address couple associate memory, ACAM 12. The ACAM 12 removes the need for translation of addresses from logical address to absolute address. However because it only has 16 locations, there is provided only storage means for 16 words of data in the cache. The function of the ACAM 12 is to associate a logical address with a piece of data residing in main memory at the corresponding "physical" address.

(b) Another cache system (ASDAM) is within the Absolute Address Generator 24 of FIG. 1A. The generator, 24, controls the operation of the "actual segment descriptor associative memory" (AS-DAM) which consists of four CAMs and three register files that work to translate addresses without needing to access main memory 40.

It should be emphasized that the absolute address list AAL 16 guarantees "coherency" of data because if there is a "Write" operation which changes any data in the main memory 40, then the Absolute Address of that location (where the main memory was changed) is also provided to the Absolute Address List 16 and thus the Absolute Address List 16 can set a flag or invalid bit, to tell whether or not the data which resides in the RAM 18 is any longer properly valid or not.

It may be noted that the CAM (Content Addressable Memory) AAL 16 compares all physical addresses which have been changed. It monitors all of the memory commands to see if a "Write" has occurred; and if a Write has occurred, the absolute address list AAL 16 will indicate to the RAM 18 which particular data location is no longer valid due to the fact of it having been changed in the main memory 40.

The address couple address scheme operates within the ACAM 12, FIG. 1A to perform several functions as follows. FUNCTIONAL EXAMPLES OF USE OF ACAM 12 (Address Couple Associative Memory):

Example 1. Consider a main memory Read operation using an Address Couple which is not currently in the Address Couple Associative Memory (ACAM). Let the Address Couple be (1,5), the corresponding physical address be 1000 and the data at that location be 123.

Figure 7A:
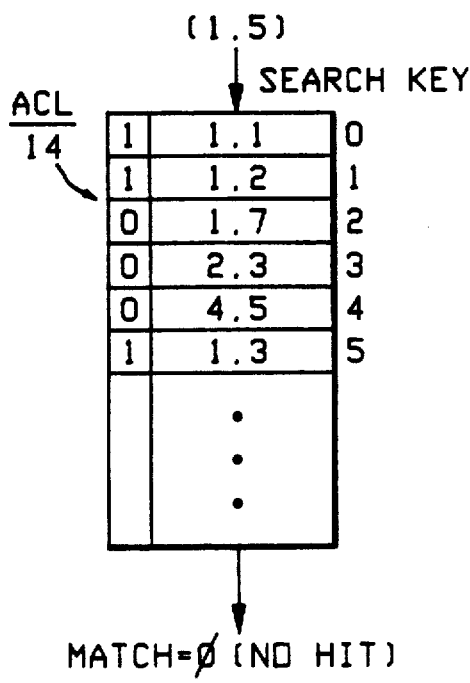
FIGS. 7A, 7B, 7C, 7D, 7E, 7F, 7G, 7H, 7I, 7J, 7K, and 7L are illustrations of operations in the Address Couple List, Absolute Address List and RAM of the Address Couple Associative Memory (ACAM).

Step 1.1 The Address Couple List in ACL 14 is searched for a valid location containing the Address couple (1,5). No match is found. (FIG. 7A).

Figure 7B:
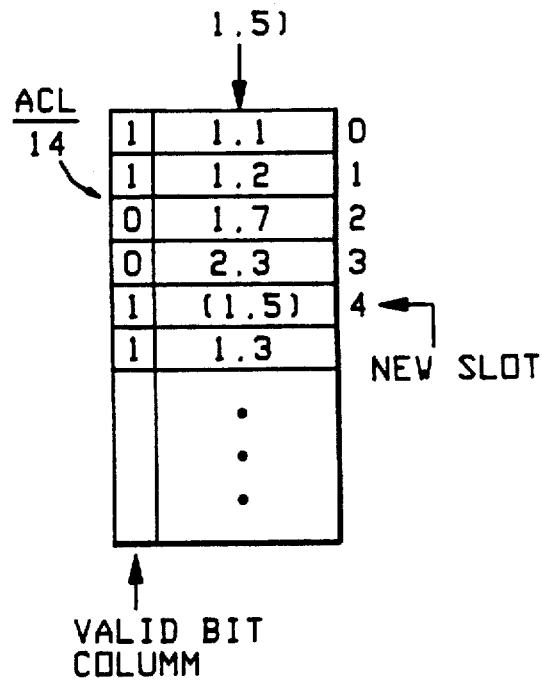

Step 1.2 A new slot (say 4) is allocated for it in ACL 14 and the value (1,5) is written into it and the location validated. (FIG. 7B).

Step 1.3 The Address Couple (1,5) is translated into its corresponding physical address (1000) and a 'Read' command for this address is issued to the main memory, 40.

Figure 7C:
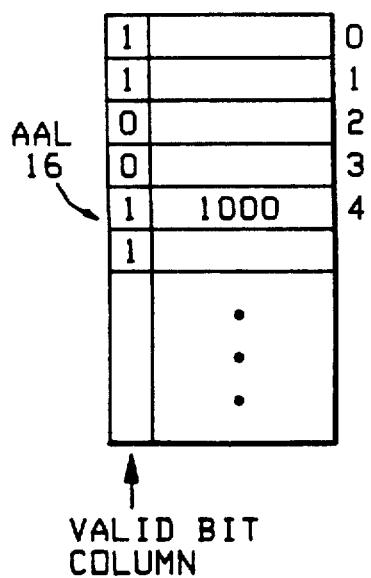

Step 1.4 The main memory physical address (1000) is written into the corresponding slot (4) of the Absolute Address List in AAL16 and this is validated. (Valid bit=1) (FIG. 7C).

Figure 7D:
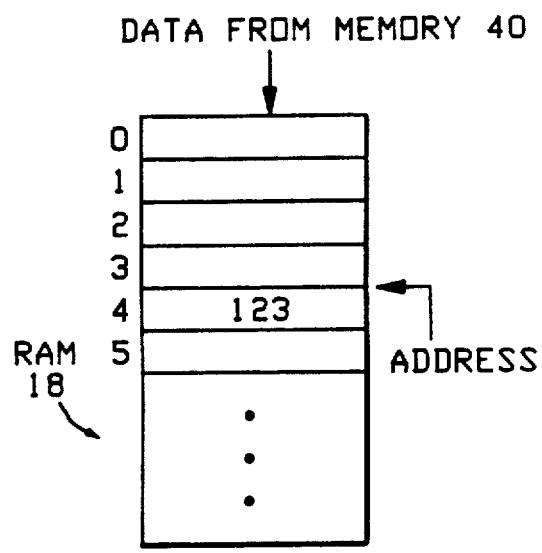

Step 1.5. The data (123) in main memory physical address 1000 is written into the corresponding slot (4) of the RAM 18 (FIG. 7D).

Example 2. A Read from main memory 40 when an ACAM Match is found:

Consider a subsequent memory read operation using the same address couple (1,5) which is now stored in the ACAM,12.

Figures 7E, 7F:
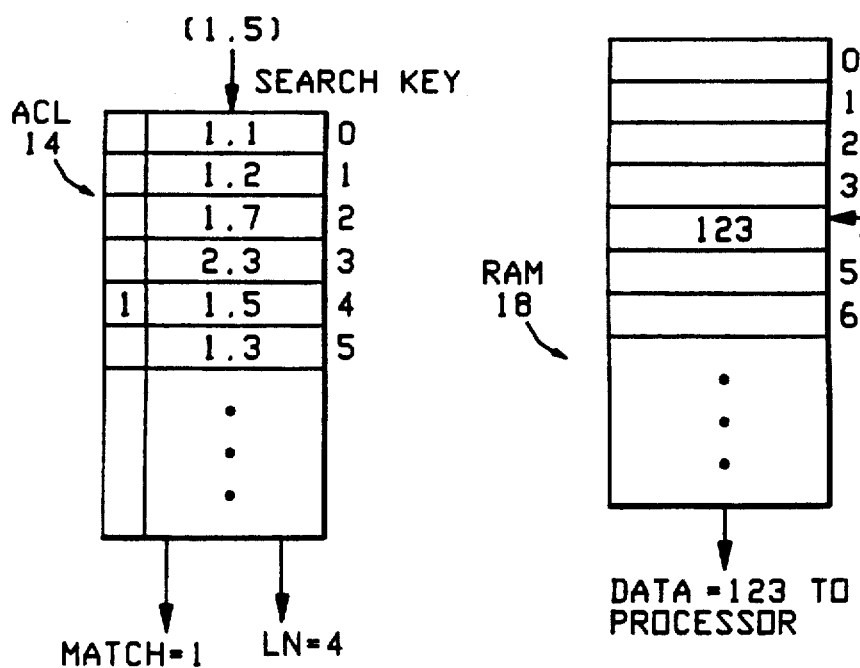

Step 2.1 The ACL 14 is searched for a valid location containing the address couple (1,5). A match is found at location 4. The ACL 14 signals a hit (match=1) and a location number 4. (FIG. 7E).

Step 2.2 The data stored at location 4 of the ACAM RAM 18 is the data (123) to be found at the absolute address in main memory that the address couple indicates. Thus instead of reading from main memory, the data (123) is read from the RAM 18 (FIG. 7F).

Example 3. A Write to main memory using an address couple:

Consider a subsequent memory Write operation using an address couple. Data 456 is going to be written to logical address (1,5).

Figures 7G, 7H:
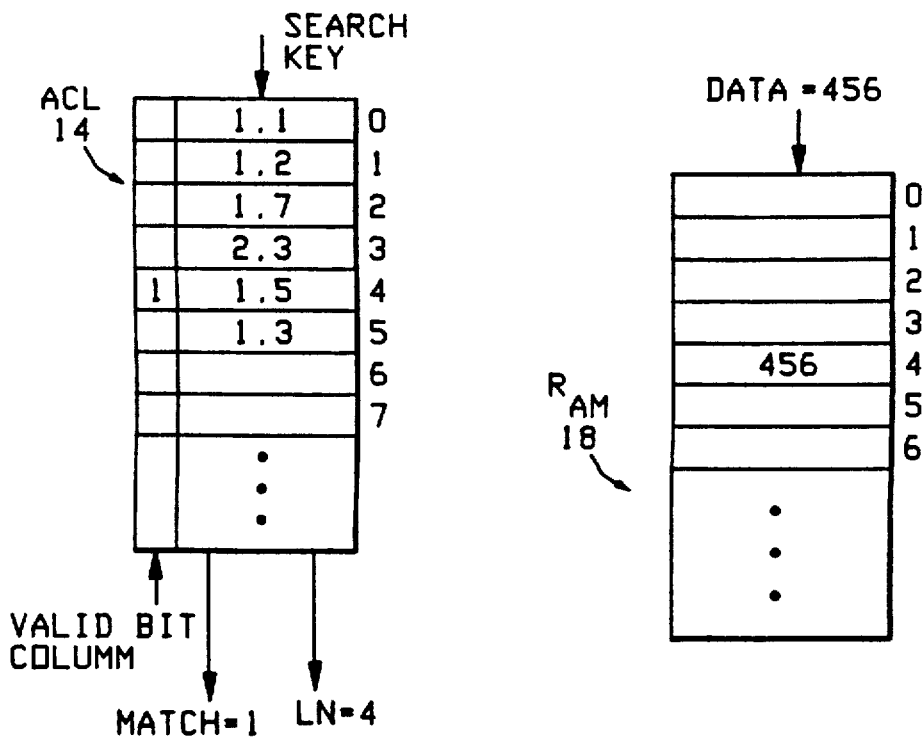

Step 3.1 Search the ACL 14 for (1,5). A "hit" is found at location 4. (FIG. 7G).

Step 3.2 Write the data (456) to be stored in main memory at the corresponding location (4) of the ACAM RAM. (FIG. 7H).

Figures 7I, 7J:
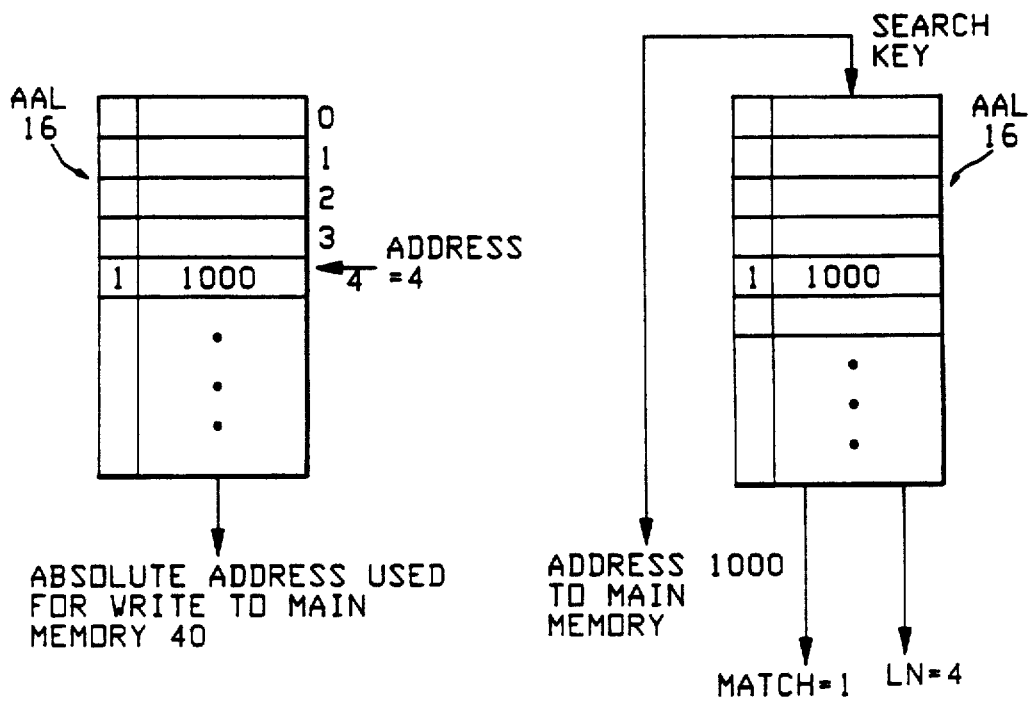

Step 3.3 Take the absolute address (1000) from the corresponding location of the AAL 16. Perform the write to main memory. Notice that this achieves a write operation directly from the logical address—the lengthy process of address translation is avoided. (FIG. 7I).

Example 4. A write to main memory 40 without using an address couple:

Consider a subsequent memory Write operation using an absolute address not specified using an address couple. Data 789 is going to be written to main memory 40, location 1000.

Step 4.1 Search the absolute address list in AAL 16 for the value 1000. A match is found at location 4. This indicates that the ACL 14 contains (at location 4) an address couple representing the address 1000 and that the RAM 18 contains (at location 4) the data (456) which is about to be overwritten at location 1000 of the main memory. (FIG. 7J).

Figure 7K:
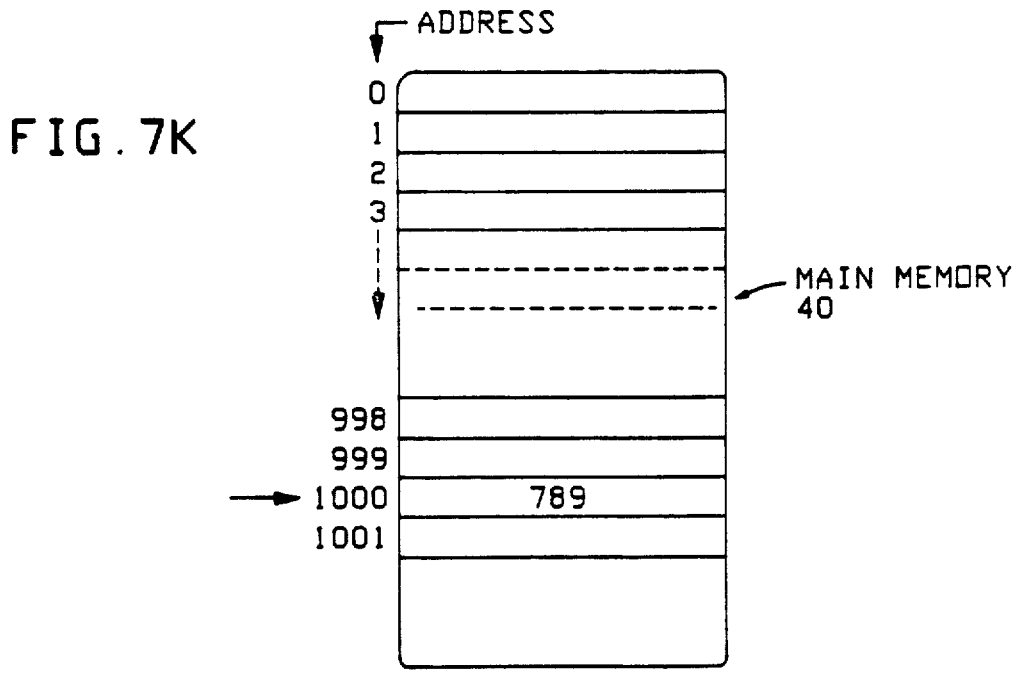

Step 4.2 Location 4 is therefore invalidated in both the ACL 14 and AAL 16 and is effectively removed from the cache. (FIG. 7K).

Figure 7L:
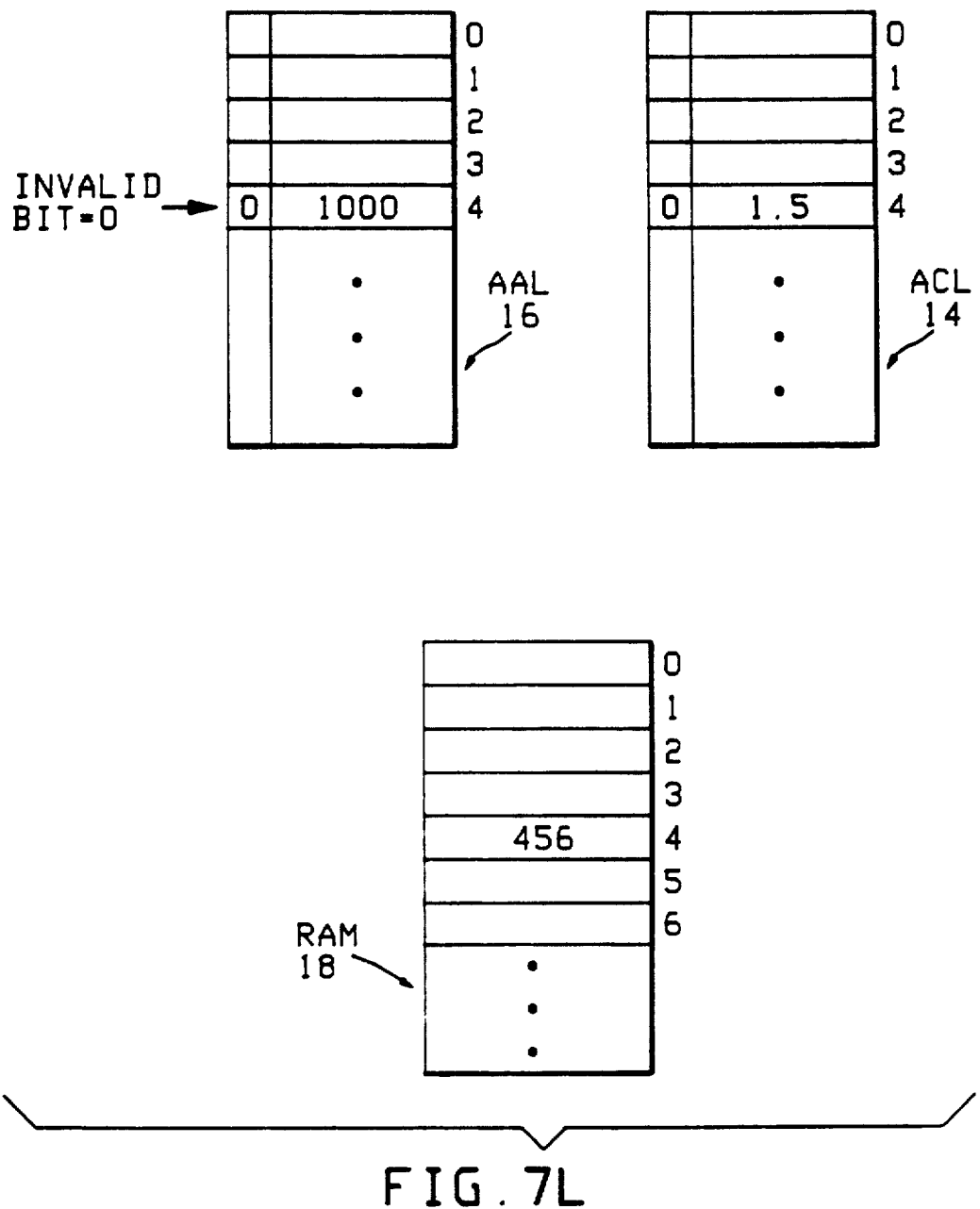

Step 4.3 Perform the Write of data 789 to location 1000 in main memory 40. (FIG. 7L).

Described herein has been a processing system providing cache coherency between the processor's private cache unit and main memory. The private cache unit has a first CAM (ACL) for holding address couple logical address data (of data in the cache) and a second CAM (AAL) holding corresponding locations for absolute physical addresses, of main memory data, which are also residing concurrently in the private cache unit.

Each time that a word of data (which duplicates a main memory location) is put into the private cache, its absolute physical address is also placed into the CAM called the absolute address list or AAL.

When the processor wants a particular data word, that is frequently used, it will first search the ACL CAM to see if the required data word resides in the private cache unit. If so, the ACL provides a hit signal to the cache RAM unit to access the data word.

When data is newly written to main memory (which could render data in the RAM cache as incoherent) the address of this main memory location is used as a search key to the ACL and AAL CAMs so that any location having a "hit" will be set up with an "invalid" bit, meaning that the data in the cache RAM for that location cannot be used and the processor must access main memory for valid data at the specified address. This can be accomplished in one clock cycle since the AAL has already provided the physical address (absolute address).

While the efficiently rapid and upgraded cache coherency and address translation system has been described in one preferred embodiment, it should be understood that the system may be effectuated in other embodiments and still be encompassed by the following claims.

What is claimed is:

1. An address couple associative memory system (ACAM) for servicing a processor and main memory means comprising:
   (a) a first content addressable memory (CAM) means for holding address-couples (logical addresses) of data words residing in a local cache RAM unit and including:
      (a1) a first dual port CAM array having N locations for storing said logical addresses and including:
         (a1a) means for searching said logical addresses and outputting, if a match occurs, a location number LN, for accessing a data word in said local cache RAM unit in a one clock cycle period;
         (a1b) means for outputting a match signal to a second CAM means and to a control unit circuit means;
   (b) said second content addressable memory (CAM) means for holding absolute main memory addresses of each said address couple residing in said first CAM means, and including:
      (b1) a second dual port CAM array having N locations for storing said absolute main memory addresses and including:
         (b1a) means for receiving said Location Number LN, when said match occurs in said first dual port CAM array;
         (b1b) means for transmitting an absolute address to said main memory during a Write operation;
         (b1c) means for outputting a match signal to said control unit circuit means;
   (c) said local cache RAM unit having N locations for holding frequently used data words and including:
      (c1) means for receiving said location number LN, from said first CAM means for outputting a data word to said processor on a read operation;
   (d) control unit circuit means for receiving said output match signal from said first CAM means, and said second CAM means, and including:
      (a1) means to set a validate/invalidate status signal for each location of address data in said first and second CAM means;
      (a2) means to generate "write enable" and "write address" signals to said local cache RAM unit and said first and second CAM means.

2. The ACAM system of claim 1 wherein said control unit circuit means includes:
   (a) means to receive a location number signal from said second content addressable memory means to then set an invalidation signal for the correspondingly numbered location of the address couple (logical address) in said first content addressable memory means.

3. The ACAM system of claim 2 wherein said second CAM means includes:
   (a) means, during a write operation, to receive the address-couple location number in said first CAM means which had a "match";
   (b) means to locate and provide a selected said absolute memory address to main memory to write a main memory word at said absolute address location when said first CAM means indicates that a match (hit) has occurred on the logical address to be written to.

4. The ACAM system of claim 3 which includes:
   (a) means to write a new data word in said main memory means at the location of an absolute address having a location number in said second CAM means, which matches the Location Number of a match location in said first CAM means, when an input search logical address couple finds a match location in said first CAM means which is valid, said search and match being executed in one clock cycle.

5. The ACAM system of claim 1 wherein said control unit circuit means includes:
   (a) means to invalidate the address couple data location in said first CAM means when a match (hit) signal from said second CAM means indicates, to said control unit circuit means, a specific Location Number in said second CAM means which correlates with a corresponding Location Number in said first CAM means, and wherein a Write operation to a main memory address matches an absolute address in said second CAM means.

6. In a processor and main memory system having an address couple associative memory (ACAM) system for data word caching and address translation of logical addresses to absolute addresses said ACAM system comprising:
   (a) a RAM cache unit for holding N data words frequently requested by said processor;
   (b) first means for holding a list of N logical addresses, each said logical address related to each data word in said RAM cache unit, said first means including:
      (b1) an address couple content addressable memory (ACL-CAM) for receiving a search key from said processor for locating a resident logical address which matches said search key (hit) and outputting a Location Number signal to said RAM cache unit, to a second means, and to a control means, said ACL-CAM using a dual ported CAM array enabling search and Location Number output in one clock cycle;
   (c) said second means (AAL-CAM) for holding a list of N main memory absolute addresses, each absolute address correlating to each data word in said RAM cache unit, said second means including:
      (c1) a contend addressable memory (AAL-CAM) using a dual ported CAM array for receiving a search key from said processor for locating a resident absolute address which matches (hit) said search key, and outputting, within one clock cycle, a hit flag and location number (LN) to said control means,
   (d) control means for setting valid/invalid tags for each said logical address and each said absolute address to insure coherency between data words in said RAM cache unit and the data words in main memory which have the same absolute address as the tagged absolute addresses in said second means.

7. The ACAM system of claim 6 wherein said control means further includes:
   (a) means to signal said processor when a match (hit) occurs during a search in said first means or said second means;
   (b) means to control the write-in of data words into said RAM cache unit and address data into said first and second means.

8. The ACAM system of claim 6 wherein said second means further includes:
   (a) means for receiving said Location Number (LN) from said first means and outputting the absolute address, residing at the same Location Number in said second means, in one clock cycle, to said main memory.

9. The ACAM system of claim 6 wherein said first means includes:
   (a) means for receiving an address couple logical address for enabling a read out of a data word from said RAM cache unit or for enabling the writing in of a data word into said RAM cache unit.

10. The ACAM system of claim 6 wherein an address couple logical address in said first means can be selected (hit), during a write-main memory new data word operation, in order to place a copy of the said new data word in a selected location of said RAM cache unit.

11. The ACAM system of claim 6 wherein an absolute address located in said second means can be selected (hit) during a write-main memory data word operation and said second means Location Number (LN) provided to said control means to generate an invalid tag for attachment onto the same numerical location number of said first means.

12. The ACAM system of claim 6 wherein said processor may write new data in main memory without transmitting an address couple logical address, to said first means thus leaving an incoherent data word in said RAM cache unit, and wherein said ACAM system includes:
   (a) means to compare the absolute address of a newly-to-be-written data word into main memory with the "valid" tagged absolute addresses in said second means (AAL) to see if a match (hit) occurs;
   (b) means to set an invalid tag onto the corresponding location in said first means (ACL) when such match (hit) occurs;
   (c) and wherein said second means includes the absolute address of each data word in said RAM cache unit and a valid/invalid tag for each said data word.

* * * * *